Patented July 14, 1936

2,047,275

UNITED STATES PATENT OFFICE 2,047,275

THERAPEUTIC PREPARATIONS

William A. Lott, East Orange, N. J., and Alfred E. Jurist, Brooklyn, N. Y., assignors to E. R. Squibb & Sons, New York, N. Y., a corporation of New York No Drawing. Application July 14, 1934, Serial No. 735,194

8 Claims. (Cl. 167—69)

In the treatment of various pathological conditions in which arsenicals are indicated, especially syphilis and Vincent's angina, 3,3'-diamino 4,4'-dihydroxy arsenobenzene dihydrochloride has been recognized as outstanding for purity, uniformity, and activity, but it has been unduly restricted in use because its aqueous solution not only takes a long time to prepare but is so toxic that it cannot safely be used as such, and the hydrochloride must be converted into its sodium salt, the solution of which, however, is so dilute that it has to be administered in inordinately large quantities. Furthermore, between 30 and 45 minutes are consumed in converting the hydrochloride solution into the sodium salt solution. As a consequence of these obstacles, the use of 3,3'-diamino 4,4'-dihydroxy arsenobenzene dihydrochloride has steadily decreased, despite its potential efficacy.

3,3'-diamino 4,4'-dihydroxy arsenobenzene dihydrochloride has been marketed in aqueous alkaline solution, but such preparations are very susceptible to oxidation, which is accompanied by an increase in toxicity; and these aqueous alkaline solutions are unstable even when maintained under anaeric conditions, the yellow solutions gradually becoming red, presumably on account of polymerization.

It is the object of this invention to provide a comparatively stable solution, which, if necessary, can be diluted with water to a considerable degree without precipitation, and which will make possible the efficient administration of 3,3'-diamino 4,4'-dihydroxy arsenobenzene in relatively high concentration.

In the practice of this invention, 3,3'-diamino 4,4'-dihydroxy arsenobenzene is dissolved in a solvent selected from the group consisting of ethylene glycol and mixtures of glycerine with beta-hydroxy diethyl ether, with diethylene glycol, and with trimethylene glycol; preferably, a nonprotein protective colloid is added; preferably, also, dissolution is effected anaerically, as by operating under nitrogen in closed containers, and the solution so prepared is employed for therapeutic purposes.

Example 1

3,3'-diamino 4,4'-dihydroxy arsenobenze dissolves readily in ethylene glycol at room temperature to form an at least 4% solution, which is clear yellow and mobile, and may be diluted with about half its volume of water before precipitation occurs.

Example 2

A mixture of 25 g. glycerin and 15 g. beta-hydroxy diethyl ether readily dissolves at least 1.5 g. 3,3'-diamino 4,4'-dihydroxy arsenobenzene. Dilution with water gives a colloidal dispersion.

Example 3

A mixture of 1207.5 g. glycerin and 517.5 g. beta-hydroxy diethyl ether dissolves 51.7 g. 3,3'-diamino 4,4'-dihydroxy arsenobenzene at ordinary temperatures.

Example 4

A mixture of 191 g. glycerin and 81.9 g. beta-hydroxy diethyl either dissolves 16.3 g. 3,3'-diamino 4,4'-dihydroxy arsenobenzene at ordinary temperatures. Dissolution, which is slower than where smaller concentrations are employed (as in Examples 2 and 3), may be accelerated by agitation.

Example 5

0.4 g. powdered acacia is heated with 40 g. glycerin at 120–130° until dissolution is complete. After the solution has cooled to room temperature, a solution of 2.4 g. 3,3'-diamino 4,4'-dihydroxy arsenobenzene in 40 g. diethylene glycol is added. There is obtained a somewhat cloudy solution which may be converted, by gradual dilution with water, into a colloidal dispersion that does not settle out for several hours. The cloudy solution becomes brilliantly clear upon addition of 8 cc. of water and heating at 45–50° for about 45 minutes, and upon further dilution forms a colloidal dispersion in which flocculation does not occur for several hours.

Example 6

1 g. sodium cetyl sulfate is dispersed in 40 g. warm glycerin, and a solution of 2.4 g. 3,3'-diamino 4,4'-dihydroxy arsenobenzene in 40 g. diethylene glycol is added. The clear solution thus obtained may be diluted with water, forming a colloidal dispersion in which flocculation does not occur for several hours.

Example 7

At least 1.2 g. 3,3'-diamino 4,4'-dihydroxy arsenobenzene dissolves readily in a mixture of 15 g. glycerine and 25 g. trimethylene glycol, and the solution on being diluted yields a colloidal dispersion.

It is to be understood that the foregoing examples are merely illustrative and by no means limitative of the invention, which may be variously otherwise embodied within the scope of the appended claims.

We claim:

1. A therapeutic preparation comprising 3,3'-diamino 4,4'-dihydroxy arsenobenzene dissolved in a solvent selected from the group consisting of ethylene glycol and mixtures of glycerin with beta-hydroxy diethyl ether, with diethylene glycol, and with trimethylene glycol.

2. A therapeutic preparation comprising 3,3'-diamino 4,4'-dihydroxy arsenobenzene dissolved in ethylene glycol.

3. A therapeutic preparation comprising 3,3'-diamino 4,4'-dihydroxy arsenobenzene dissolved in a mixture of glycerin with diethylene glycol.

4. A therapeutic preparation comprising 3,3'-diamino 4,4'-dihydroxy arsenobenzene dissolved in a mixture of glycerin with diethylene glycol.

5. A therapeutic preparation comprising 3,3'-diamino 4,4'-dihydroxy asenobenzene dissolved in a solvent selected from the group consisting of ethylene glycol and mixtures of glycerin with beta-hydroxy diethyl ether, with diethylene glycol, and with trimethylene glycol; and a nonprotein protective colloid.

6. A therapeutic preparation comprising 3,3'-diamino 4,4'-dihydroxy arsenobenzene dissolved in ethylene glycol, and a nonprotein protective colloid.

7. A therapeutic preparation comprising 3,3'-diamino 4,4'-dihydroxy arsenobenzene dissolved in a mixture of glycerin with diethylene glycol, and a nonprotein protective colloid.

8. A therapeutic preparation comprising 3,3'-diamino 4,4'-dihydroxy arsenobenzene dissolved in a mixture of glycerin with trimethylene glycol, and a nonprotein protective colloid.

WILLIAM A. LOTT.
ALFRED E. JURIST.